No. 850,388. PATENTED APR. 16, 1907.
J. S. METCALFE.
CHECK OR OTHER FINANCIAL INSTRUMENT BLANK.
APPLICATION FILED DEC. 14, 1905.

Fig. 1.

Fig. 2.

WITNESSES:

INVENTOR
James S. Metcalfe
BY
ATTORNEYS

UNITED STATES PATENT OFFICE.

JAMES S. METCALFE, OF NEW YORK, N. Y.

CHECK OR OTHER FINANCIAL-INSTRUMENT BLANK.

No. 850,388.   Specification of Letters Patent.   Patented April 16, 1907.

Application filed December 14, 1905. Serial No. 291,703.

*To all whom it may concern:*

Be it known that I, JAMES S. METCALFE, a citizen of the United States of America, and a resident of New York, county and State of New York, have invented certain new and useful Improvements in Checks or other Financial-Instrument Blanks, of which the following is a specification, reference being had to the accompanying drawings, forming a part thereof.

My invention relates to improvements in checks or other financial instruments, and particularly to that class of bank-checks known as "safety-checks."

The main object of my invention is to provide a simple form of safety-check or the like in which a portion of the check may be torn off in order to indicate by the part that is left an amount not exceeding that for which the check may be drawn.

In most forms of safety-checks different numerals are employed to indicate units, tens, hundreds, thousands, &c., and from this is apt to arise confusion, from which serious mistakes may easily result.

In my present invention the greatest amount for which the check may be drawn is clearly indicated by numerals and ciphers, arranged in the most readily readable manner—*i. e.*, reading from left to right in a horizontal line and at the foot of the remaining numerals which appear in columns thereabove.

In order that my invention may be fully understood, I will now proceed to describe in detail a check constituting an embodiment thereof and will then point out the novel features in claims.

In the drawings, Figure 1 is a face view of a blank check embodying my invention, showing the same attached to a stub. Fig. 2 is a similar view of the check detached from the stub and with a portion of the extension removed, the check-blank being filled out for an amount not exceeding the greatest amount appearing on the extension.

The check-blank shown in the drawings comprises as a whole three portions—the main or body portion 1, the stub 2, and an extension 3. The main or body portion of the check 1 may be any ordinary form of check and the stub may also be of any desired character. The extension 3 is arranged at the right-hand end of the check, being at that end opposite to the end at which the check is normally attached to the stub. Printed on the extension 3 in a vertical line and close to the body portion of the check are the words "Not over the largest amount." Substantially the remainder of the extension is divided into nine horizontal lines or spaces, subdivided again into six vertical rows. These lines and rows as subdivided comprise fifty-four substantially square spaces. The nine spaces contained in the first vertical row contain each therein the dollar-sign. The second row contain therein the numerals "1" to "9," while the remaining spaces contain ciphers, one in each space. The lines subdividing the extension preferably comprise perforations or rulings, so that portions of the extension comprising any number of spaces from one to the total number employed may be readily removed. The check in this form may be made out for any sum of money not exceeding ninety thousand dollars. By removing one or more of the lower rows the sum of money not exceeding that for which the check may be drawn will be any amount in the tens of thousands in accordance with the number of rows removed. Thus removing three of the rows would leave the highest amount as sixty thousand dollars, while removing eight of the rows would leave an amount not exceeding ten thousand dollars. The numerals "1" to "9" then with their ciphers in the complete blank represent tens of thousands of dollars; but the said numerals may easily represent thousands, hundreds, tens, or units by merely removing one or more vertical rows of ciphers. Thus to remove one vertical row of ciphers would cause the numerals to represent thousands instead of tens of thousands, and the removal of horizontal rows, in addition to the entire vertical row, would cause the largest amount to be just so many thousands of dollars as is represented by the largest numeral remaining.

In Fig. 2 the five lowermost horizontal rows have been removed, together with the entire end vertical row, and the largest amount that this check may be drawn for is four thousand dollars. If another vertical row of ciphers had been removed from the end of the extension, the largest amount would have been four hundred dollars, and similarly if two more rows had been removed, the largest amount would be forty dollars, and if all the ciphers had been removed the largest amount for which the check could have been drawn would have been four dollars. By removing all the ciphers and all the numerals but the top ones the check could be drawn for but one dollar. By the foregoing, then, it will be seen that a check made in accordance with my invention has a very wide range—namely, from one dollar to ninety thousand dollars—and by merely adding one or more rows of ciphers the check may be made to cover any amount. For practical purposes a check which has a range from one dollar to ninety thousand dollars is sufficient.

By the foregoing, then, it will be seen that by the use of but a single set of numerals, properly arranged, together with accompanying ciphers, I have produced a check which will properly indicate amounts within a wide range, and that without any confusion or liability to error. Where different numerals are employed to indicate units, tens, hundreds, thousands, &c., as is common, there is a liability to error, owing to the confusion which arises; but this is entirely obviated in my present instrument, as there is but one set of figures to read.

Safety-checks as ordinarily employed have their safety-extension portion at the left-hand end of the check and between the check and the stub; but I prefer to place the extension at the right-hand end of the check, because I am enabled then more conveniently to remove successive ciphers from the ends of the rows of numbers in order to change the value of the numerals at the left-hand end thereof. The extension may, however, be otherwise disposed, if desired.

While for purposes of illustration I have shown my invention as applied to bank-checks, it will be obvious that the same is applicable to other financial instruments, and, in fact, to any blank in which varying amounts are to be indicated.

What I claim is—

1. A check or other financial instrument comprising a body portion and an extension, the extension having thereon a group of characters comprising a column of numerals followed by several columns of ciphers, the individual ciphers of the columns being arranged horizontally in lines with the respective numerals.

2. An instrument of the class described having at its end and forming part thereof a rectangular group consisting of the nine digits arranged in numerical order in a vertical column, each digit followed by an indefinite number of ciphers in a horizontal line, said ciphers terminating near an edge of the instrument whereby any or all of the digits and ciphers are adapted to be conveniently removed from the rest of the instrument in vertical columns or horizontal rows, or parts of columns or rows, the last of the remaining rows expressing the sum mentioned in the instrument, or approximating that sum.

In witness whereof I have hereunto set my hand this 13th day of December, 1905.

JAMES S. METCALFE.

Witnesses:
D. HOWARD HAYWOOD,
LYMAN S. ANDREWS, Jr.